US009495428B1

(12) United States Patent
Rastogi et al.

(10) Patent No.: US 9,495,428 B1
(45) Date of Patent: *Nov. 15, 2016

(54) FILTERING OUTPUT FROM OPERATIONAL COMMANDS EXECUTED ON A NETWORK DEVICE

(71) Applicant: Juniper Networks, Inc., Sunnyvale, CA (US)

(72) Inventors: Sachin Kumar Rastogi, Bangalore (IN); Nilesh Kantilal Simaria, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,219

(22) Filed: Nov. 2, 2015

Related U.S. Application Data (63) Continuation of application No. 13/332,122, filed on Dec. 20, 2011, now Pat. No. 9,178,781.

(51) Int. Cl.
*H04L 12/26* (2006.01)
*G06F 17/30* (2006.01)
*H04L 12/24* (2006.01)

(52) U.S. Cl.
CPC ... *G06F 17/30554* (2013.01); *G06F 17/30424* (2013.01); *G06F 17/30557* (2013.01); *G06F 17/30914* (2013.01); *H04L 41/0604* (2013.01); *H04L 43/00* (2013.01); *H04L 43/028* (2013.01); *H04L 43/04* (2013.01); *H04L 43/045* (2013.01); *H04L 43/06* (2013.01); *H04L 43/08* (2013.01); *H04L 43/0876* (2013.01); *H04L 43/14* (2013.01); *H04L 43/18* (2013.01)

(58) Field of Classification Search
CPC ..... H04L 43/00; H04L 43/028; H04L 43/04; H04L 43/045; H04L 43/06; H04L 43/08; H04L 43/0876; H04L 43/14; H04L 43/18; H04L 41/0604
See application file for complete search history.

(56) References Cited

U.S. PATENT DOCUMENTS

| 7,483,965 B1 | 1/2009 | Gerraty |
| 8,156,213 B1 | 4/2012 | Deng |
| 8,799,437 B1 | 8/2014 | Kumbhari |
| 9,178,781 B1 | 11/2015 | Rastogi et al. |

(Continued)

OTHER PUBLICATIONS

"XML Schema Part 0: Primer, Second Edition," available at http://www.w3.org/TR/xmlschema-0/, W3C Recommendation, Oct. 28, 2004, 71 pp.

(Continued)

*Primary Examiner* — Le Luu
(74) *Attorney, Agent, or Firm* — Shumaker & Sieffert, P.A.

(57) ABSTRACT

In general, techniques are described to enable selective viewing of data output in response to a command. The techniques provide generic mechanisms to filter output solicited by commands supported by current and future implementations of an interface. An example device receives from a client device an input comprising an operational command a selection request that specifies a field identifier. A schema enumeration module of the device assigns a unique element number to each element of a class of elements defined by a schema, forming an enumerated schema. An interface of the device receives data conforming to a data description language, and a filtering module filters the textual output by mapping the field identifier specified in the selection request to a unique element number of the enumerated schema. A rendering module renders the filtered data into filtered textual output. The device transmits the filtered textual output to the client device.

22 Claims, 3 Drawing Sheets

(56) References Cited

U.S. PATENT DOCUMENTS

| | | | | |
|---|---|---|---|---|
| 2009/0119280 A1* | 5/2009 | Waters | | G06F 17/30864 |
| 2009/0252134 A1* | 10/2009 | Schlicht | | H04L 1/0015 |
| | | | | 370/338 |
| 2010/0142700 A1* | 6/2010 | Lee | | H04L 12/2856 |
| | | | | 379/413.02 |
| 2010/0299430 A1* | 11/2010 | Powers | | H04L 12/2809 |
| | | | | 709/224 |
| 2011/0250883 A1* | 10/2011 | Pyhtila | | H04W 24/08 |
| | | | | 455/424 |
| 2012/0005243 A1* | 1/2012 | Van der Merwe | | H04L 41/145 |
| | | | | 707/812 |
| 2012/0089886 A1* | 4/2012 | Baptist | | H03M 13/05 |
| | | | | 714/752 |
| 2012/0102448 A1* | 4/2012 | Haugestuen | | G06F 17/5036 |
| | | | | 716/134 |

OTHER PUBLICATIONS

"XML Schema Part 1: Structures Second Edition," available at http://www.w3.org/TR/xmlschema-1/, W3C Recommendation, Oct. 28, 2004, 98 pp.

"XML Schema Part 2: Datatypes Second Edition," available at http://www.w3.org/TR/xmlschema-2/, W3C Recommendation, Oct. 28, 2004, 100 pp.

Prosecution History from U.S. Appl. No. 13/332,122, dated May 18, 2015 through Sep. 1, 2015, 23 pp.

* cited by examiner

FILTERING OUTPUT FROM OPERATIONAL COMMANDS EXECUTED ON A NETWORK DEVICE

The application is a continuation of U.S. application Ser. No. 13/332,122, filed Dec. 20, 2011, the entire contents of which are hereby incorporated herein by reference.

TECHNICAL FIELD

The present disclosure relates to computer networks, and, more specifically, to user interfaces for devices within computer networks.

BACKGROUND

A computer network is a collection of interconnected computing devices that exchange data and share resources. Examples of network devices include routers, switches, firewalls, VPN appliances and security devices.

Administrators configure, manage, and otherwise interact with network devices to ensure and monitor network operation. For example, an administrator may interact with a router via a client device (e.g., a management device) to set various configuration parameters and to collect and view current settings and statistics. In many cases, a router will output rich and voluminous data to a requesting client device, thus providing a complete response to the request.

Network devices in general, and routers in particular, are becoming more and more powerful and versatile in terms of their performance and capabilities. In turn, these network devices are gaining complexity in their architecture, operation, and functionality. As a result, tasks such as configuring and managing these network devices are also becoming more complex and intricate.

SUMMARY

In general, techniques of the present disclosure enable a user to selectively view data that a router outputs in response to an operational command. More specifically, techniques of the present disclosure provide a schema enumeration module that classifies data in an extensible markup language (e.g., "XML") into distinct portions in accordance with an XML schema that defines the data. More specifically, the schema enumeration module assigns a unique element number to each element of the defining XML schema. The schema enumeration module then correlates portions of the XML data to unique element numbers in the enumerated schema. By correlating portions of the XML data to the unique element numbers of the enumerated schema, the schema enumeration module enables automatic filtering of the XML data based on the enumeration.

Techniques further provide a filtering module that enables a user to filter the XML data by mapping a user-specified field identifier to a unique element number of the enumerated schema, and modifying the textual output accordingly. The filtering module accepts a selection request that specifies criteria by which to filter the XML data. For example, a selection request may specify parameters by which to either include certain portions of the XML data, or exclude certain portions. The selection request specifies a portion of the XML data by specifying a field identifier that corresponds with a unique element number of the enumerated schema. Since each portion of the XML data is correlated to a unique element number of the enumerated schema, the field identifier is sufficient for the filtering module to identify a portion of the XML data. Based on the parameters specified in the selection request, the filtering module selects portions of the XML data to form filtered XML data.

Techniques further provide a rendering module that converts the filtered XML data into a textual format that is intelligible to a user. The rendering module thus generates "filtered textual output" that is in a format that a user can comprehend, and includes data that is both responsive to the operational command and conformant to the selection request. The router then transmits the filtered textual output to the client device. Thus, by utilizing the techniques described in the present disclosure, a user can "selectively view" specific portions of the textual output.

In one example, a method in accordance with one or more aspects of the present disclosure includes receiving, at an interface of a network router, an input from a client device using a communicative connection, wherein the input comprises an operational command and a selection request, and wherein the selection request specifies a field identifier. The method also includes enumerating a schema identified by the operational command to form an enumerated schema, wherein the schema defines a class of elements that conform to a data description language, and wherein the enumerating includes assigning a unique element number to each element of the defined class of elements. The method further includes receiving, at the interface, data generated based at least in part on the schema, wherein the received data conforms to the data description language, and filtering the received data to form filtered data, wherein the filtering includes mapping the field identifier specified by the selection request to a unique element number of the enumerated schema. The method further includes rendering the filtered data to form a filtered textual output comprising one or more fields, wherein each field is associated with a unique element number of the enumerated schema, and transmitting, from the interface, the filtered textual output to the client device using the communicative connection.

In another example, a routing device in accordance with one or more aspects of the present disclosure includes a network interface that receives an input from a client device using a communicative connection, wherein the input comprises an operational command and a selection request, and wherein the selection request specifies a field identifier. The routing device also includes a schema enumeration module that enumerates a schema identified by the operational command to form an enumerated schema, wherein the schema defines a class of elements that conform to a data description language, and wherein the schema enumeration module enumerates the schema at least in part by assigning a unique element number to each element of the defined class of elements. The routing device also includes an interface that receives data generated based at least in part on the schema, wherein the received data conforms to the data description language, and a filtering module that filters the received data to form a filtered data, wherein the filtering module filters the received data at least in part by mapping the field identifier specified by the selection request to a unique element number of the enumerated schema. The routing device also includes a rendering module of the schema enumeration module that renders the filtered data to form a filtered textual output comprising one or more fields, wherein each field is associated with a unique element number of the enumerated schema. The routing device also includes a transmission module of the network interface that transmits the textual output from the interface to the client device using the communicative connection.

In another example, a computer-readable medium includes instructions for causing a programmable processor of a routing device to receive, at an interface of the routing device, an input from a client device using a communicative connection, wherein the input comprises an operational command and a selection request, and wherein the selection request specifies a field identifier. The computer-readable medium also includes instructions for causing a programmable processor of the routing device to enumerate a schema identified by the operational command to form an enumerated schema, wherein the schema defines a class of elements that conform to a data description language, and wherein the enumerating includes assigning a unique element number to each element of the defined class of elements. The computer-readable medium also includes instructions for causing a programmable processor of the routing device to receive, at the interface, data generated based at least in part on the schema, wherein the received data conforms to the data description language, filter the received data to form filtered data, wherein the filtering includes mapping the field identifier specified by the selection request to a unique element number of the enumerated schema, and render the filtered data to form a filtered textual output comprising one or more fields, wherein each field is associated with a unique element number of the enumerated schema. The computer-readable medium also includes instructions for causing a programmable processor of the routing device to transmit, from the interface, the filtered textual output to the client device using the communicative connection.

In another example, a method includes receiving, at a user interface (UI) of a client device, an input comprising an operational command and a selection request, wherein the selection request specifies a field identifier and one or more parameters. The method also includes transmitting, from a network interface of the client device, the input to a routing device using a communicative connection, and receiving, at the network interface, a filtered textual output from the routing device, wherein the filtered textual output forms at least a portion of a textual output solicited by the operational command, and wherein the filtered textual output conforms to the one or more parameters specified by the selection request. The method also includes providing the filtered textual output for display at the UI of the client device.

In another example, a client device includes a user interface (UI) that receives an input comprising an operational command and a selection request, wherein the selection request specifies a field identifier and one or more parameters. The client device also includes a network interface that transmits the input to a routing device using a communicative connection, and receives a filtered textual output from the routing device, wherein the filtered textual output forms at least a portion of a textual output solicited by the operational command, and wherein the filtered textual output conforms to the one or more parameters specified by the selection request. The client device also includes a display device that provides the filtered textual output for display at the UI.

The techniques described herein may provide certain advantages. For example, the techniques provide generic mechanisms that allow a user to define a specific search query or output filter for any command supported by a schema-driven interface of a network device in accordance with aspects of the present disclosure. These generic mechanisms are scalable in that they may be applied without change (or "on-box") to any command supported by future versions of the schema-driven interface. As another example, the techniques provide an elegant mechanism by which a user is able to easily reduce the amounts of output to locate information that is relevant to the user. By including a selection request in an input, the user is able to utilize the filtering module to request that only certain data be displayed. Conversely, the user can specify certain data (or families of data) that the user wishes to be excluded from the output. As a result, the user can view data pertinent to the user's request, and avoid viewing unnecessary data that is otherwise associated with the pertinent data. As another example, the techniques described herein may reduce the amount of data transmitted over the network. The selection request is implemented by the router, i.e. the router filters the output before transmitting to the client device. Since the router transmits filtered output to the client device, techniques of the present disclosure enable more efficient use of network bandwidth and resources.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
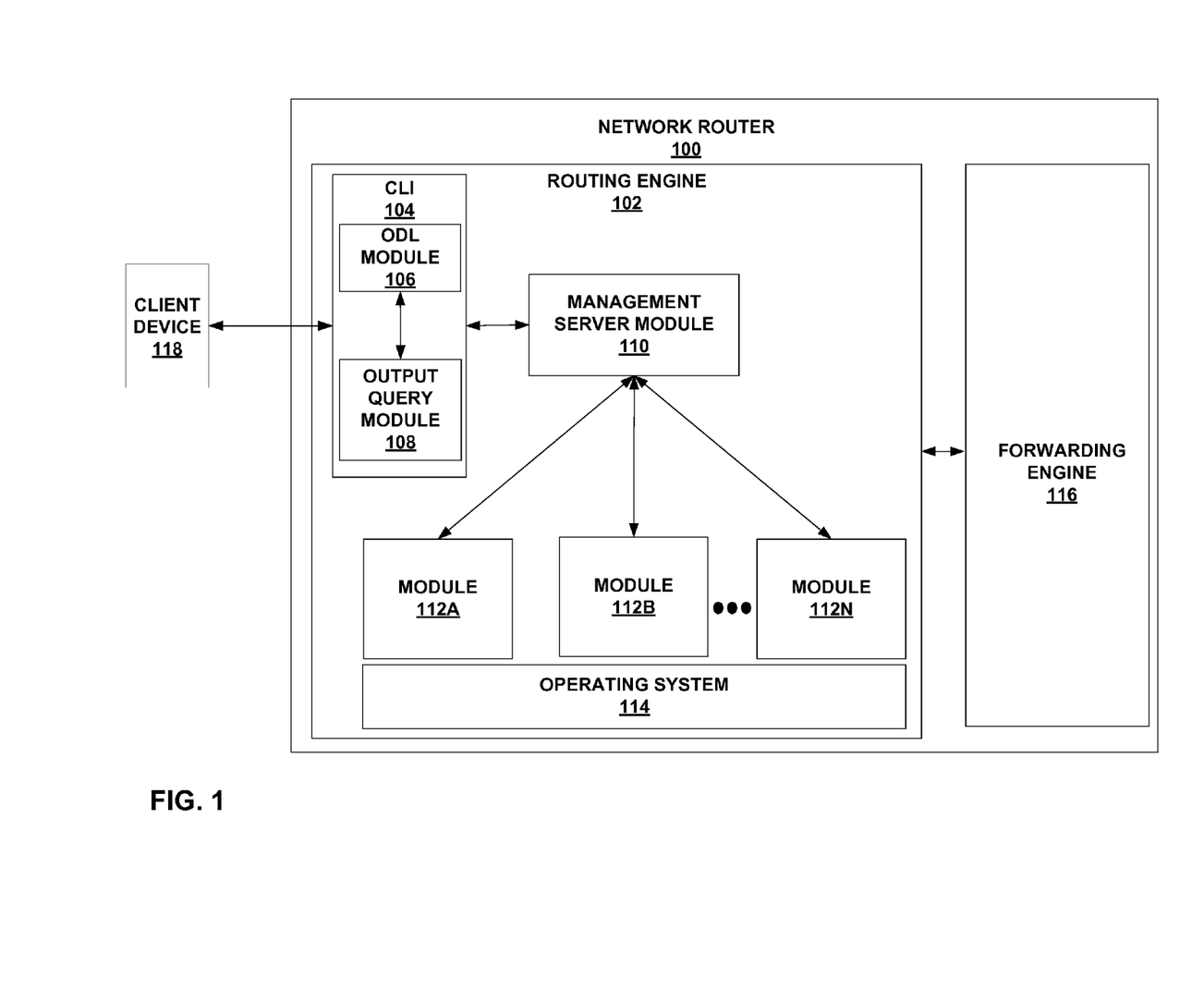
FIG. 1 is a block diagram illustrating an example network router that incorporates a routing engine in accordance with one or more aspects of the present disclosure.

FIG. 1 is a block diagram illustrating an example network router 100 that includes routing engine 102 and forwarding engine 116, in accordance with one or more aspects of the present disclosure. In the example of FIG. 1, routing engine 102 executes software that provides a command line interface (CLI) 104. CLI 104 is one non-limiting example of an interface provided by the techniques of the present disclosure. In addition, routing engine 102 includes an operating system 120 that provides an operating environment for executing one or more other control processes. Examples of such processes include management server module 110 and software modules 112A-112N ("software modules 112"). Some non-limiting examples of software modules 112 include a chassis module, a device configuration module, a routing protocol module, an event management module, and a simple network management protocol (SNMP) module, to name a few.

CLI 104 facilitates communication between network router 100 and client device 118 and supports a command syntax that allows client device 118 to configure the operation of the network router as well as view current operational settings and statistics. Client device 118 may be a standalone computer executing a web browser or other client-side software component or a network management system executing a sophisticated configuration tool. Network router 100 and client device 118 may communicate using one of several network protocols. Examples of such communication protocols include telnet and secure shell (SSH) or SNMP. Further details of example communications between a network management system and a managed device, such as a router, may be found in U.S. patent application Ser. No. 12/688,635, "DYNAMIC OPTIMIZATION OF DEVICE MANAGEMENT COMMAND FOR BULK RETRIEVAL OF CONFIGURATION DATA," incorporated herein by reference.

In some examples, CLI 104 receives operational commands entered by a user via client device 118. In other examples, CLI 104 receives operational commands issued by a script or other management software executed by client device 118. In either case, the operational commands supported by the command syntax of CLI 104 may be capable of producing significant output data. For example, CLI 104 may support a command such as a "SHOW" command, for viewing current physical components and configuration parameters of network router 100. In cases where router 100 is a high-end network router, such as a core router, the resultant output produced by execution of the operational command may be significant. Further details of example structures for implementing operational commands within a device, such as a router, can be found in U.S. patent application Ser. No. 10/339,719, "GENERATION OF A CONFIGURATION PATCH FOR NETWORK DEVICES," incorporated herein by reference.

As described herein, CLI 104 provides generic mechanisms that allow client device 118 to narrowly tailor the execution of virtually any operational command supported by the CLI. For example, as further described below, the generic mechanisms allow client device 118 to more specify particular queries or output filters for any operational command supported by the command syntax. The generic mechanisms may be used with any command without requiring modification to the syntax and semantics for the specific command. Moreover, the mechanisms are extensible and scalable in that they are implemented by CLI 104 in a manner that allow the mechanisms to automatically be applied by the CLI as new commands are supported by future versions of the command syntax.

In the example of FIG. 1, CLI 104 receives input specifying one or more operational commands and forwards the operational commands to management server module 110. Management server module 110 processes the input and directs the operational commands to the appropriate software modules 112 for execution. Management server module 110 then receives any output data from software modules 112 from execution of the commands, and forwards the data to CLI 104. Network router 100 produces the output data in a form that conforms to a data description language, such as the extensible markup language ("XML"), and in a structure that is defined by one or more schemas.

Devices that support data description languages, such as XML, often employ one or more schemas to define XML data generated by the device. More specifically, an XML schema specifies schema components to define the meaning, usage, and relationships of elements within the generated XML data. An XML schema may be described using one of several XML schema definition languages, such as "XML Schema" published by the World Wide Web Consortium (W3C), Document Content Description for XML (DCD), DOCUMENT Definition Markup Language (DDML), Regular Language for XML Next Generation (RELAX NG), Schema for Object-Oriented XML (SOX), and Document Structure Description (DSD), among others. Example of schema-driven configuration interface for a device, such as a router, can be found in U.S. patent application Ser. No. 12/510,062, "MERGING NETWORK DEVICE CONFIGURATION SCHEMAS," incorporated herein by reference. XML schemas and corresponding validation procedures are described in greater detail by W3C, XML Schema Part 0: Primer (Oct. 28, 2004, Second Edition, editors David C. Fallside and Priscilla Walmsley); W3C, XML Schema Part 1: Structures Second Edition (Oct. 28, 2004, Second Edition, editors Henry S. Thompson et al.); and W3C, XML Schema Part 2: Datatypes (Oct. 28, 2004, Second Edition, editors Paul V. Biron and Ashok Malhotra), which are each incorporated by reference herein in their respective entireties.

As shown in FIG. 1, CLI 104 includes output definition language (ODL) module 106 and output query module 108 that operate to provide generic mechanisms that allow client device 118 to define a specific search query or output filter for any operational command supported by the CLI. Client device 118 may avail of these generic mechanisms by sending CLI 202 a user input that includes both an operational command and a selection request. For example, after CLI 104 receives data from management server module 110, ODL module 106 and output query module 108 operate collaboratively to filter and convert (or "render") the received data into a filtered textual output. In one example, ODL module 106 and output query module 108 filter and render the data into filtered textual output by using a four-step process. First, ODL module 106 identifies the particular module of software modules 112 that generated the data. Second, output query module 108 enumerates an XML schema associated with the identified module by assigning a unique element number to each element specified within the XML schema. Third, output query module 108 filters the received data based on the selection request included in the user input. Fourth, ODL module 106 converts the filtered data to textual format, and arranges the filtered textual data to make the filtered textual data intelligible to a user. Example arrangements include tabular, hierarchical, and numbered list arrangements. In some examples, ODL module 106 arranges the textual data by correlating various fields in the textual data with enumerated elements of the schema from which the textual data was generated. In some examples, the operational command includes a "show interfaces" command. In these examples, the corresponding XML schema may include elements such as an interface name, administrator status, and logical interface, among others. The XML schema may further include the name, administrator status, etc. of the logical interface element. In one such example, ODL module 106 generates textual output arranged in a tabular fashion. In this example, the table includes field headings corresponding to elements of the XML schema from which the textual output was generated.

In this manner, the command syntax supported by CLI 104 has been enhanced with a generic mechanism that allows client device 118 to include a selection request when issuing any of the commands supported by the router. For any given command supported by CLI 104, a selection request may be used to specify a particular search query or output filter relative to the enumeration of the schema defining the elements of the output data produced by execution of the command. Moreover, as described in further detail below, CLI 104 has been enhanced to allow a user to easily view the enumeration of the schema associated with the output data for any operational command, thereby allowing the user to easily construct selection requests when issuing operational commands to network router 100. Although described for exemplary purposes with respect to router 100, the techniques may be applied to any managed device.

Figure 2:
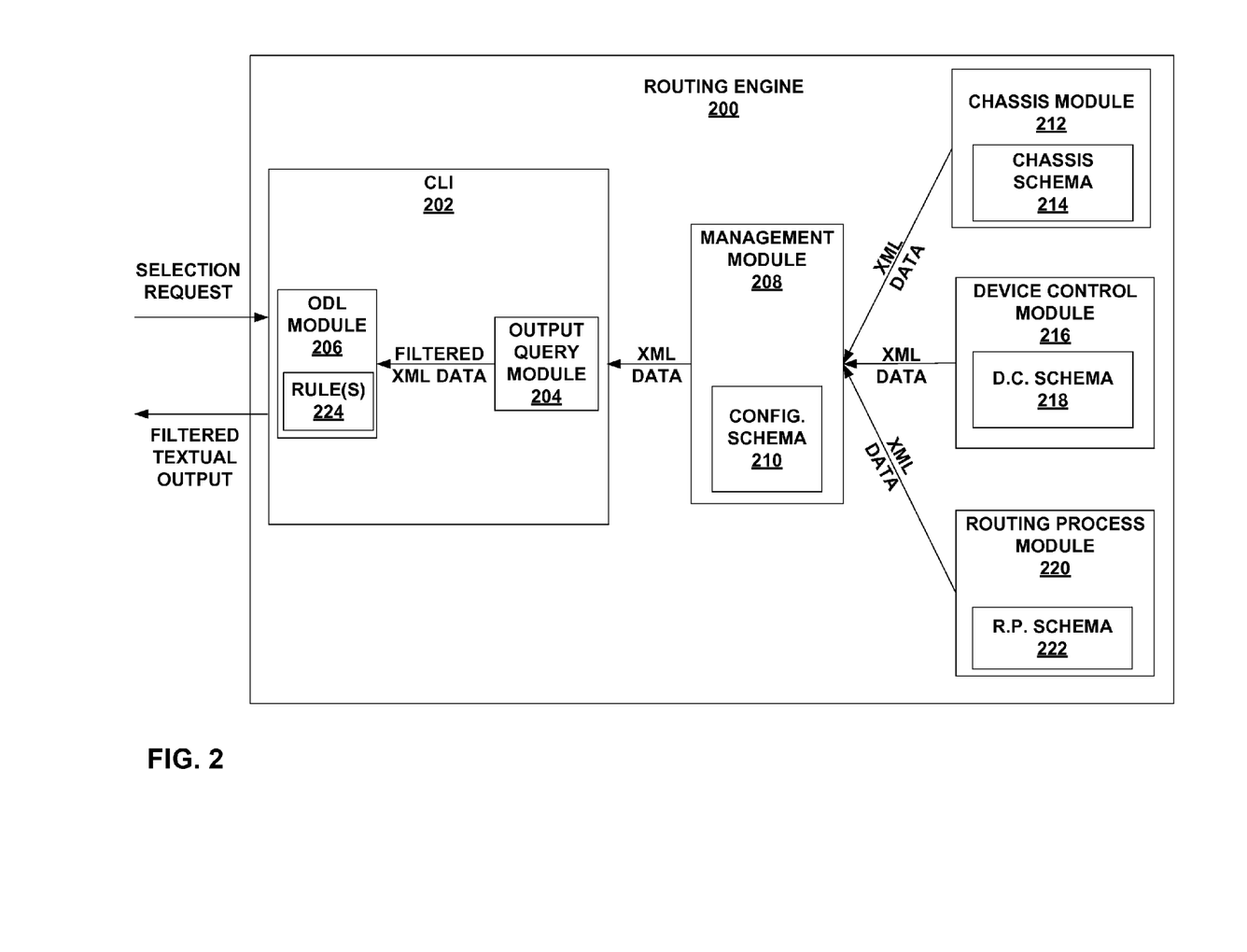
FIG. 2 is a block diagram illustrating an example routing engine of a network router, in accordance with one or more aspects of the present disclosure.

FIG. 2 is a block diagram illustrating an example routing engine 200 of a network router, in accordance with one or more aspects of the present disclosure. Routing engine 200 is one non-limiting example of routing engine 102 illustrated in FIG. 1. As shown in FIG. 2, routing engine 200 includes command line interface (CLI) 202, management module 208, chassis module 212, device control module 216, and routing protocol module 220. Chassis module 212, device control module 216, and routing protocol module 220 are three non-limiting examples of software modules 112 illustrated in FIG. 1. CLI 202 further includes output query module 204 and output definition language (ODL) module 206. Output query module 204 and ODL module 206 are non-limiting examples of a filtering module and a schema enumeration module, respectively. Management module 208 further includes an XML schema, namely, configuration schema 210. Similarly, chassis module 212 includes chassis schema 214, device control module 216 includes device control schema 218, and routing process module 220 includes routing process schema 222.

CLI 202 is one non-limiting example of CLI 104 of FIG. 1. As discussed with respect to FIG. 1, CLI 202 is capable of receiving user input that includes both an operational command and a selection request. After CLI 202 receives a user input including an operational command and a selection request, CLI 202 forwards the operational command to management module 208. Management module 208 utilizes configuration schema 210 to identify a software module that includes an XML schema associated with the operational command. Management module 208 then forwards the operational command to the identified software module. In the specific example of FIG. 2, management module 208 may forward an operational command to one or more of chassis module 212, device control module 216, and routing protocol module 220. The particular software module that received the operational command then generates XML data (defined by the software module's XML schema) responsive to the operational command, and sends the XML data to management module 208.

In one example, CLI 202 receives an operational command that solicits information pertaining to a routing process implemented by routing engine 200. In this example, management module 208 utilizes configuration schema 210 to determine that routing process module 220 includes the appropriate XML schema (namely, routing process schema 222) to respond to the operational command. Management module 208 then sends the operational command to routing process module 220, and routing process module 220 generates XML data responsive to the operational command. Routing process module 220 utilizes routing process schema 222 to define the generated XML data. Routing process module 220 sends the generated XML data to management module 208. Management module 208 then forwards the received XML data to CLI 202.

In this and other examples, CLI 202 receives XML data sent from management module 208, and utilizes output query module 204 to filter the XML data according to a user input. In the example illustrated in FIG. 2, CLI 202 receives a user input that includes a selection request. As discussed, CLI 202 receives the selection request concurrently with an operational command included in a user input. In some examples, the selection request specifies one or more elements of the schema from which the XML data was generated, and uses the specified element(s) to define one or more parameters by which to filter the XML data. CLI 202 utilizes output query module 204 to apply the parameter(s) of the selection request to the XML data, thus generating filtered XML data. In some examples, output query module 204 may filter the received XML data by using a two-step process. First, output query module 204 enumerates an XML schema (in this case, routing process schema 222) by assigning a unique element number to each element of the XML schema. Second, output query module maps the element(s) specified in the selection request to the element numbers of the XML schema, and applies the parameters of the selection request to filter the received XML data accordingly.

An example of an operational command is a "show interfaces" operational command. As discussed, management module 208 forwards the "show interfaces" operational command to the appropriate software module (e.g., routing process module 220). In some examples, CLI 202 also receives, concurrently with the "show interfaces" operational command, a selection request to filter the output transmitted in response to the "show interfaces" operational command. In one such example, the selection request defines a parameter associated with an "administrator status" element of routing process schema 222. More specifically, the selection request defines a parameter that states that the resulting output only include data such that the "administrator status" field includes a value of "down." In this example, output query module 204 applies the selection request to filter out all portions of the XML data that include "administrator status" fields with values other than "down."

In the example illustrated in FIG. 2, output query module 204 sends the filtered XML data to ODL module 206. In some examples, ODL module 206 is itself an XML schema that defines XML data that CLI 202 can generate. In these and other examples, ODL module stores so-called "metadata" associated with one or more software modules and/or the software modules' respective XML schemas (e.g., chassis module 212 and/or chassis schema 214). In other examples, ODL module 206 includes an XML schema known as a definition schema. In these examples, ODL module 206 utilizes the definition schema to define XML data that CLI 202 can generate.

ODL module 206 defines one or more rules 224 for rendering the filtered XML data received from output query module 204 into textual format, forming "filtered textual output." Examples of rules 224 include formatting and rendering rules, among others. In some examples, ODL module 206 defines rules 224 to include one or more formatting rules by which to arrange fields of the filtered textual output (e.g., whether to arrange the textual output in tabular, hierarchical, or numbered list formats, among others). After receiving the filtered XML data from output query module 204, ODL module 206 applies rules 224 to convert the filtered XML data into filtered textual output. CLI 202 then sends the filtered textual output to the client device that forwarded the user input including the operational command and the selection request.

Figure 3:
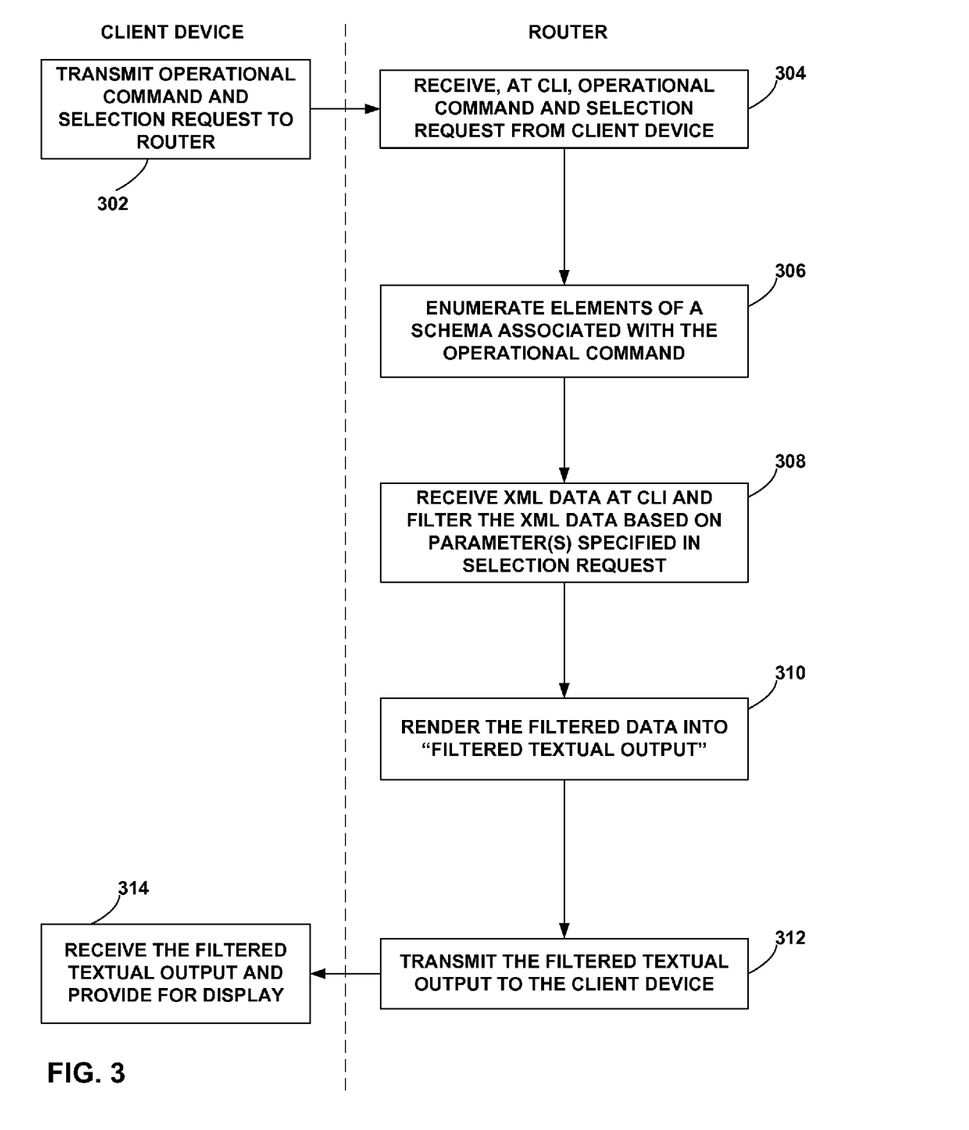
FIG. 3 flow chart illustrating an example process by which a router participates in a communicative session with a client device, in accordance with one or more aspects of the present disclosure.

FIG. 3 is a flowchart illustrating an example process by which a router participates in a communicative session with a client device, in accordance with one or more aspects of the present disclosure. For purposes of illustration only, FIG. 3 will be described with respect to the devices of FIGS. 1-2. In the example of FIG. 3, client device 118 transmits a user input to a router, such as router 100 (302). In one example, the user input includes both an operational command and a selection request. Router 100 then receives the transmitted input at a command line interface, such as CLI 104 (304). In one example, router 100 responds to the operational command of the user input by executing a number of steps. First, router 100 identifies an XML schema (e.g., routing process schema 222) that corresponds to the operational command.

In many instances, one of software modules 112 running on router 100 includes the identified XML schema (e.g., routing process module 220 includes routing process schema 222). In these instances, router 100 forwards the operational command to the particular module of software modules 112 that includes the identified XML schema. Responsive to the operational command, the software module generates XML data that conforms to the schema. In some examples, device control module 216 generates XML data (e.g., an XML document) that includes one or more fields defined by elements of device control schema 218. Device control module 216 then sends the generated XML data to CLI 202. In one such example, device control module 216 sends the XML data to a central software module, such as management module 208, and management module 208 forwards the XML data to CLI 202. In some examples, software modules 112 device may also be termed as "daemons" or "processes" running on an operating system of the router.

Router 100 then enumerates the schema identified with the operational command (306). The router may enumerate the schema using an output query module, e.g., output query module 204 of routing engine 200. In some examples, the output query module is a part of the CLI (e.g., output query module 204 of CLI 202). In other examples, the output query module is external to the CLI, but is communicatively coupled to the CLI. ODL module 206 also includes an XML schema, namely, definition schema 226. In some examples, definition schema 206 includes elements that indicate what types of information may be emitted by software modules 112 of router 100. In some examples, definition schema 226 includes elements that indicate the types of information that chassis schema 214 can emit. In one such example, definition schema 226 includes elements associated with elements of chassis schema 214. In this example, since chassis module 212 generates and emits XML data defined by chassis schema 214, definition schema 226 includes indications of the types of data that chassis module 212 may emit.

In some examples, router 100 enumerates the identified XML schema by assigning a unique element number to each element of the identified XML schema. For example, routing process schema 222 includes elements corresponding to one or more interfaces of client devices communicatively connected to the router. Example elements of routing process schema 222 include a name, administrator status, and logical interface associated with each interface. In one such example, router 100 assigns a unique element number to each of the name, the administrator status, and the logical interface elements of routing process schema 222.

Router 100 then filters the XML data received in response to the operational command based on one or more parameters defined in a selection request of the user input (308). In some examples, router 100 utilizes an output query module (e.g., output query module 108 or output query module 204) to filter the XML data. In some examples, the parameter(s) are based on one or more elements of the corresponding XML schema (in this case, routing process schema 222). As discussed, a user input may include both an operational command and a selection request.

Router 100 then renders the filtered XML data into a textual format (310). The resulting output may be known as "filtered textual output." In one example, to render the filtered XML data into filtered textual output, router 100 utilizes ODL module 106 to convert the filtered XML data into text that is intelligible to a user. Additionally, router 100 may arrange the filtered textual output in a tabular fashion (e.g., using elements of the corresponding XML schema as field headings), or in a hierarchical fashion (e.g., based on a hierarchy of the corresponding schema), among other examples. An example of an operational command (without an accompanying selection request) and its corresponding output in a tabulated textual format is presented below:

| regress@bng-ui-vm-09> show interfaces terse | | | | |
|---|---|---|---|---|
| Interface | Admin | Link | Proto | Local |
| em0.0 | up | up | inet | 10.209.3.211/18 |

In the example presented, the user input includes a "show interfaces" operational command. For purposes of illustration only, the example output includes data associated with a single interface. Router 100 arranges the textual output in a tabulated fashion to include a list of field headings. In this example, the field headings include an interface name ("interface"), administrator status ("admin"), link status ("link"), address family name ("proto"), and address ("local"). As discussed, these field headings correspond to elements of an XML schema, e.g. routing process schema 222.

As discussed, router 100 generates the textual output from XML data generated by a software module of router 100 (e.g., routing process module 220). The XML data corresponding to the textual output illustrated above appears as follows:

```
<physical-interface>
    <name>em0</name>
    <admin-status>up</admin-status>
    <oper-status>up</oper-status>
    <logical-interface>
        <name>em0.0</name>
        <admin-status>up</admin-status>
        <oper-status>up</oper-status>
        <address-family>
            <address-family-name>inet</address-family-name>
            <interface-address>
                <ifa-local>10.209.3.211/18</ifa-local>
            </interface-address>
        </address-family>
    </logical-interface>
</physical-interface>
```

As discussed, a user input may include both an operational command and a selection request. Two examples of user input and corresponding output are presented below. The first example user input includes only an operational command, and appears as follows:

| regress@bng-ui-vm-09> show interfaces terse | | | | |
|---|---|---|---|---|
| Interface | Admin | Link | Proto | Local |
| cbp0 | up | up | | |
| demux0 | up | up | | |
| dsc | down | up | | |
| em0 | up | up | | |
| em0.0 | up | up | inet | 10.209.3.211/18 |
| gre | up | up | | |
| ipip | up | up | | |
| irb | up | up | | |
| lo0 | up | up | | |
| lo0.0 | up | up | inet | 127.0.0.1 |
| lo0.16384 | up | up | inet | 127.0.0.1 |
| lo0.16385 | down | up | inet | 128.0.0.4 |
| lo0.32768 | up | up | | |
| lsi | up | up | | |
| mtun | up | up | | |

| regress@bng-ui-vm-09> show interfaces terse | | | | |
|---|---|---|---|---|
| Interface | Admin | Link | Proto | Local |
| pimd | up | up | | |
| pime | up | up | | |
| pip0 | down | down | | |
| pp0 | up | up | | |
| tap | up | up | | |

As shown, the user input includes a "show interfaces" operational command. In this example, the textual output corresponding to the "show interfaces" operational command includes data associated with 20 interfaces (illustrated by the presence of 20 rows, apart from the row of field headings). The textual output is arranged in a tabular format, and includes the same field headings as the output illustrated in the previous example.

A second example of a user input includes both an operational command as well as a selection request. In this example, the user may first utilize a "context-sensitive help" to view an enumerated representation of attributes of an XML schema associated with the operational command. An example use of context-sensitive help associated with the "show interfaces" operational command appears as follows:

```
regress@bng-ui-vm-09> show interfaces terse | filter select-query ?
   1    physical-interface
   2      name
   3      admin-status
   4      oper-status
   5      logical-interface
   6        name
   7        admin-status
   8        oper-status
   9        address-family
  10          address-family-name
  11          interface-address
  12          ifa-local
```

The illustrated context-sensitive help command includes an operational command ("show interfaces") and an enumeration request ("filter select-query ?"). As illustrated, the output responsive to the context-sensitive help includes a list of fields, and each field is associated with a unique field number. For example, field number "10" is associated with an "address family name" field of a logical interface. In some examples, each field is associated with an attribute of an XML schema associated with the operational command. In the example illustrated above, an XML schema identified by the "show interfaces" operational command includes elements associated with an interface name, administrator status, operational status, and logical interface. The schema further includes elements associated with the logical interface, such as an address family. The schema further includes elements associated with the address family (e.g., an interface address). As shown, the textual output includes fields arranged in a hierarchical format. More specifically, fields that represent elements associated with the logical interface are indented further than fields that represent elements associated directly with the physical interface. Similarly, fields that represent attributes associated with the address family of the logical interface are indented further still.

Based on the enumerated schema displayed in response to the context-sensitive help command, a user may formulate a selection request to include in the user input. In some examples, a user adds a selection request to the discussed example of a "show interfaces" operational command. For example, a user may wish to selectively view those portions of the output that include a "down" value associated with an administrator status element. As shown in the above example, the output includes two fields associated with an administrator status element described in the schema. The first such field is associated with a physical interface element, and the second such field is associated with a logical interface element.

To selectively view portions of the output that include a "down" value associated with administrator status, a user may include a selection request that specifies the unique field numbers associated with the administrator status attributes of the schema. As shown in the context-sensitive help output illustrated, fields representing the administrator status elements are associated with field numbers "3" and "7." An example user input that includes the "show interfaces" operational command and a selection request that utilizes field identifiers associated with the administrator status elements is illustrated below.

| regress@bng-ui-vm-09> show interfaces terse \| filter select-query ($3 == "down" \|\| $7 == "down") | | | | |
|---|---|---|---|---|
| Interface | Admin | Link | Proto | Local |
| dsc | down | up | | |
| lo0.16385 | down | up | inet | 128.0.0.4 |
| pip0 | down | down | | |

In the example illustrated, the selection request specifies two field identifiers, namely, field identifiers "$3" and "$7" associated with field numbers 3 and 7, respectively. The selection request solicits output that includes a "down" value associated with either field number "3" or field number "7" as indicated in the context-sensitive help. As discussed, each field listed in the context-sensitive help is associated with an attribute of an XML schema that defines the output. In the illustrated example, field identifiers "$3" and "$7" specify the administrator status of a physical interface, and administrator status of a logical interface, respectively.

The corresponding output includes data associated with three interfaces. As shown in the illustrated output, each interface includes a "down" value in at least one of the specified fields. More specifically, the first two interfaces include a "down" value associated with the administrator status of the physical interface, and the third interface includes a "down" value associated with both an administrator status of the physical interface as well an administrator status of the logical interface.

The selection request of the illustrated example filters the output by specifying a field identifier(s), and a value(s) that should be included in fields identified by the field identifier. In other examples, the selection request specifies values to be omitted from the output. One such example of a selection request appears as follows:

regress@bng-ui-vm-09> show interfaces terse | filter select-query ($3 !="down" | $7 !="down")

In this example, the selection request specifies the same field identifiers (namely, fields associated with field numbers "3" and "7" of the context-sensitive help). Router 100 applies the selection request to filter the output to include only those portions that include a value other than "down" for both the administrator status of the physical interface and the administrator status of the logical interface.

As shown in the above examples, a selection request may use Boolean operators to define parameters. For example, to solicit an output that includes a "down" value associated with field number "3," the selection request includes an expression that reads as follows:

$3=="down"

Similarly, to solicit an output that includes a "down" value associated with either field number "3" or field identifier "7," the selection request includes an expression that appears as follows:

$3=="down" || $7=="down"

Both examples include well-known Boolean operators, such as "||" to signify an "or" operation.

In the examples described, each selection request specifies one or more field identifiers, and specifies one or more values to either include or exclude from the filtered output. These examples illustrate examples of selection requests that are termed as "select query" selection requests.

In other examples, a selection request specifies one or more field identifiers, and filters the output by either including or excluding all data associated with the identified field(s). These examples illustrate selection requests that are termed as "select field" requests. An example of a user input that applies a "select field" selection request to the "show interfaces" operational command is illustrated below.

| regress@bng-ui-vm-09> show interfaces terse | filter select-field exclude $10 | | |
|---|---|---|---|
| Interface | Admin | Link | Local |
| cbp0 | up | up | |
| demux0 | up | up | |
| dsc | down | up | |
| em0 | up | up | |
| em0.0 | up | up | 10.209.3.211/18 |
| gre | up | up | |
| ipip | up | up | |
| irb | up | up | |
| lo0 | up | up | |
| lo0.0 | up | up | 127.0.0.1 |
| lo0.16384 | up | up | 127.0.0.1 |
| lo0.16385 | down | up | 128.0.0.4 |
| lo0.32768 | up | up | |
| lsi | up | up | |
| mtun | up | up | |
| pimd | up | up | |
| pime | up | up | |
| pip0 | down | down | |
| pp0 | up | up | |
| tap | up | up | |

In this example, the field heading identified by field identifier "$10" is excluded from the output. More specifically, field identifier "$10" identifies a field associated with field number "10" as shown in the context-sensitive help output. Field number "10" is associated with an "address family name" attribute of the XML schema corresponding to the "show interfaces" operational command. In this example, the filtered output does not include the field heading "proto," associated with the address family name attribute. The filtered output also does not include any data associated with the address family name attribute.

Similarly, the "select field" selection request may specify one or more field identifiers in order to include data in the filtered output. For example, a user input that includes a "show interfaces" command and a "select field" selection request may appear as follows:

regress@bng-ui-vm-09> show interfaces terse | filter select-field include $5

In this example, the "select field" selection request filters the output to only include data associated with field number "5" referenced in the context-sensitive help. More specifically, the illustrated user input will solicit output that includes data defined by the "logical interface" element of the XML schema identified by the "show interfaces" operational command. However, the solicited output will not include data associated with other field numbers of the context-sensitive help (e.g., field number "2," which identifies a "name" element that is directly associated with the physical interface).

By applying the selection request to the output generated in response to the operational command, router 100 generates a "filtered textual output." Next, router 100 transmits the filtered textual output to client device 118 using the communicative connection (312). In many examples, the filtered textual output includes a significantly reduced quantity of data than the textual output before filtering. Due to the significant reduction in data quantity, router 100 more efficiently uses the communicative connection (e.g., consuming less network bandwidth) when transmitting the filtered textual output to client device 118.

Client device 118 then receives the filtered textual output and provides the filtered textual output for display (314). Since the user specified the selection request (302), the filtered textual output matches parameters of the user's choosing. By displaying the filtered textual output, client device 118 enables the user to selectively view the textual output generated in response to the operational command. Since the user selectively views the textual output, the user need not sort through unwanted information before locating the information the user wishes to view. In many examples, the filtered textual output is limited to information that the user specified using the selection request.

Various examples have been described. These and other examples are within the scope of the following claims.

What is claimed is:

1. A method comprising:
   receiving, at an interface of a network device, input from a client device using a communicative connection, wherein the input comprises an operational command and a selection request, and wherein the selection request specifies a field identifier;
   processing the operational command with the network device to generate data that conforms to an enumerated schema, wherein the enumerated schema defines a class of elements that conform to a data description language, and wherein the enumerated schema assigns a unique element number to each element of the defined class of elements;
   filtering the data to form filtered data, wherein the filtering includes mapping the field identifier specified by the selection request to a unique element number of the enumerated schema;
   rendering the filtered data to form a filtered textual output comprising one or more fields, wherein each field is associated with a unique element number of the enumerated schema; and
   transmitting, from the interface, the filtered textual output to the client device using the communicative connection.

2. The method of claim 1, wherein the interface comprises a command line interface (CLI).

3. The method of claim 1, wherein the data description language is an extensible markup language (XML).

4. The method of claim 1, wherein the filtering comprises omitting a portion of the received data that is associated with the unique element number mapped to field identifier.

5. The method of claim 1, wherein the filtering comprises omitting one or more portions of the received data that are different from the portion associated with the unique element number mapped to field identifier.

6. The method of claim 1, wherein the selection request further specifies a data value.

7. The method of claim 6, wherein the filtering comprises omitting a portion of the received data that includes the specified data value.

8. The method of claim 6, wherein the filtering comprises omitting a portion of the received data that includes a second data value different from the specified data value.

9. A network device comprising:
a network interface that receives an input from a client device using a communicative connection, wherein the input comprises an operational command and a selection request, and wherein the selection request specifies a field identifier;
a hardware-based processor configured to:
process the operational command with the network device to generate data that conforms to an enumerated schema, wherein the enumerated schema defines a class of elements that conform to a data description language, and wherein the enumerated schema assigns a unique element number to each element of the defined class of elements,
filter the data to form filtered data by mapping the field identifier specified by the selection request to a unique element number of the enumerated schema,
render the filtered data to form a filtered textual output comprising one or more fields, wherein each field is associated with a unique element number of the enumerated schema, and
transmit the filtered textual output to the client device using the communicative connection.

10. The network device of claim 9, wherein the processor filters the received data at least in part by omitting a portion of the received data that is associated with the unique element number mapped to the field identifier.

11. The network device of claim 9, wherein the processor filters the received data at least in part by omitting one or more portions of the received data that are different from the portion associated with the unique element number mapped to field identifier.

12. The network device of claim 9, wherein the selection request further specifies a data value.

13. The network device of claim 12, wherein the processor filters the received data at least in part by omitting a portion of the received data that includes the specified data value.

14. The network device of claim 12, wherein the processor filters the received data at least in part by omitting a portion of the received data that includes a second data value different from the specified data value.

15. A non-transitory computer-readable medium comprising instructions for causing a programmable processor of a network device to:
receive, at an interface of the network device, an input from a client device using a communicative connection, wherein the input comprises an operational command and a selection request, and wherein the selection request specifies a field identifier;
process the operational command with the network device to generate data that conforms to an enumerated schema, wherein the enumerated schema defines a class of elements that conform to a data description language, and wherein the enumerated schema assigns a unique element number to each element of the defined class of elements;
filter the received data to form filtered data, wherein the filtering includes mapping the field identifier specified by the selection request to a unique element number of the enumerated schema;
render the filtered data to form a filtered textual output comprising one or more fields, wherein each field is associated with a unique element number of the enumerated schema; and
transmit, from the interface, the filtered textual output to the client device using the communicative connection.

16. A method comprising:
receiving, at a user interface (UI) of a client device, an input comprising an operational command and a selection request, wherein the selection request specifies a field identifier and one or more parameters, and wherein the field identifier maps to a unique element of a schema that defines a class of elements for configuration data of a network device;
transmitting, from a network interface of the client device, the input to the network device, using a communicative connection;
receiving, at the network interface, a filtered textual output from the network device, wherein the filtered textual output forms at least a portion of a textual output solicited by the operational command, and wherein the filtered textual output comprises configuration data that is filtered based on the mapping of the field identifier to the unique element of the schema and conforms to the one or parameters specified by the selection request; and
providing the filtered textual output for display at the UI of the client device.

17. The method of claim 16, wherein a parameter of the one or more parameters requests omission from the filtered textual output a field of the textual output, and wherein the field is associated with the field identifier.

18. The method of claim 16, wherein a parameter of the one or more parameters requests inclusion in the filtered textual output a field of the textual output, and wherein the field is associated with the field identifier.

19. The method of claim 16, wherein the one or more parameters include a first data value.

20. The method of claim 19, wherein the filtered textual output does not include a portion of the textual output that includes the first data value.

21. The method of claim 19, wherein the filtered textual output includes a portion of the textual output that includes the first data value and the filtered textual output does not include a portion of the textual output that includes a second data value different from the first data value.

22. A client device comprising:
a user interface (UI) that receives an input comprising an operational command and a selection request, wherein the selection request specifies a field identifier and one or more parameters, and wherein the field identifier maps to a unique element number of an enumeration of a schema identified by the operational command, wherein the schema defines a class of elements that conform to a data description language and is used by a network device to control output of configuration information by the network device, and wherein the enumeration of the schema assigns a unique element number to each element of the defined class of elements;
a network interface that transmits the input to a network device using a communicative connection, and receives a filtered textual output from the network device, wherein the filtered textual output comprises one or more fields, wherein each field is associated with a unique element number of the enumerated schema, and wherein the filtered textual output is filtered based on the mapping of the field identifier to the enumeration of the schema and conforms to the one or more parameters specified by the selection request; and
a display device that provides the filtered textual output for display at the UI.

* * * * *